(12) United States Patent
Dickson

(10) Patent No.: US 10,905,191 B2
(45) Date of Patent: Feb. 2, 2021

(54) ATHLETIC SHOE PROTECTOR

(71) Applicant: Anthony Dickson, Alpharetta, GA (US)

(72) Inventor: Anthony Dickson, Alpharetta, GA (US)

(73) Assignee: Dickson Management & Consulting, LLC, Alpharetta, GA (US)

(*) Notice: Subject to any disclaimer, the term of this patent is extended or adjusted under 35 U.S.C. 154(b) by 79 days.

(21) Appl. No.: 15/845,114

(22) Filed: Dec. 18, 2017

(65) Prior Publication Data

US 2018/0168274 A1    Jun. 21, 2018

Related U.S. Application Data

(60) Provisional application No. 62/436,656, filed on Dec. 20, 2016.

(51) Int. Cl.
| | |
|---|---|
| *A43B 3/16* | (2006.01) |
| *A43C 13/00* | (2006.01) |
| *A43C 19/00* | (2006.01) |
| *B29C 61/02* | (2006.01) |
| *A43B 5/18* | (2006.01) |
| *B29L 31/50* | (2006.01) |
| *A43B 23/02* | (2006.01) |
| *A43B 3/26* | (2006.01) |
| *A43B 5/02* | (2006.01) |

(52) U.S. Cl.
CPC ............... *A43B 3/16* (2013.01); *A43B 5/18* (2013.01); *A43C 13/00* (2013.01); *A43C 19/00* (2013.01); *B29C 61/02* (2013.01); *A43B 3/26* (2013.01); *A43B 5/02* (2013.01); *A43B 23/0215* (2013.01); *A43B 23/0255* (2013.01); *B29L 2031/50* (2013.01)

(58) Field of Classification Search
CPC .............. A43B 3/16; A43B 3/242; A43B 5/18
See application file for complete search history.

(56) References Cited

U.S. PATENT DOCUMENTS

| 3,040,451 | A | * | 6/1962 | Hilkemeyer | ............. | A43B 5/18 36/7.5 |
| 3,402,323 | A | * | 9/1968 | Longstreth | ............. | A43B 3/163 361/223 |

(Continued)

OTHER PUBLICATIONS

Overholt, "VeloToze Reinvents the Shoe Cover with New Rubberized Protection"; www.bikerumor.com; Nov. 3, 2014.

(Continued)

*Primary Examiner* — Jila M Mohandesi
(74) *Attorney, Agent, or Firm* — Bryan W. Bockhop; Bockhop Intellectual Property Law, LLC

(57) ABSTRACT

A shoe has an upper portion with an outer surface, a sole and a closure. A heat shrinkable plastic material is formed into a shoe cover that defines a recess complementary in shape to an upper portion of the shoe. The shoe cover defines a bottom opening having dimensions so as to expose the sole of the shoe when the shoe is placed within the recess. The shoe cover also defines a top opening having dimensions so as expose the closure while still covering the substantially all of the upper portion except for the closure. The heat shrinkable plastic material includes a material that causes the shoe cover to shrink to the outer surface of the shoe when subjected to heat at a predetermined temperature.

16 Claims, 14 Drawing Sheets

(56) References Cited

U.S. PATENT DOCUMENTS

| | | | | |
|---|---|---|---|---|
| 3,419,929 A * | 1/1969 | Snow | A43D 11/003 | |
| | | | 12/142 R | |
| 3,634,954 A * | 1/1972 | Larsen | A43B 3/106 | |
| | | | 36/7.3 | |
| 3,693,269 A * | 9/1972 | Guarrera | A43B 13/32 | |
| | | | 36/15 | |
| 3,694,939 A * | 10/1972 | Chen | A43B 3/16 | |
| | | | 36/7.3 | |
| 3,737,723 A * | 6/1973 | Kanor | A43B 3/163 | |
| | | | 361/223 | |
| 3,775,793 A * | 12/1973 | Casavant | A43B 3/163 | |
| | | | 12/1 R | |
| 3,821,858 A | 7/1974 | Haselden | | |
| 4,069,599 A | 1/1978 | Alegria | | |
| 5,566,476 A | 10/1996 | Rertrand et al. | | |
| 5,694,704 A * | 12/1997 | Kasbrick | A43B 3/16 | |
| | | | 36/59 R | |
| 5,711,092 A | 1/1998 | Despres et al. | | |
| 6,151,804 A | 11/2000 | Hieblinger | | |
| 7,854,025 B2 * | 12/2010 | Spinelli | A42B 3/003 | |
| | | | 156/84 | |
| 8,225,529 B2 | 7/2012 | Simms | | |
| 2014/0075791 A1 * | 3/2014 | Smith | A43B 1/0027 | |
| | | | 36/72 R | |
| 2015/0265003 A1 * | 9/2015 | Lauria | A43B 1/0027 | |
| | | | 2/245 | |
| 2016/0165965 A1 * | 6/2016 | Ellis | A41D 1/002 | |
| | | | 434/81 | |
| 2017/0066212 A1 * | 3/2017 | de Backer | B29D 35/126 | |
| 2017/0318895 A1 * | 11/2017 | Thomasson | A43B 3/244 | |
| 2018/0116330 A1 * | 5/2018 | Christian | A43B 1/0072 | |
| 2018/0368524 A1 * | 12/2018 | Taniguchi | A43B 1/04 | |

OTHER PUBLICATIONS

Sneaker Shields, "Never Crease Your Kicks Again"; believed to have been published by Dec. 11, 2017; www.sneakershields.com.

* cited by examiner

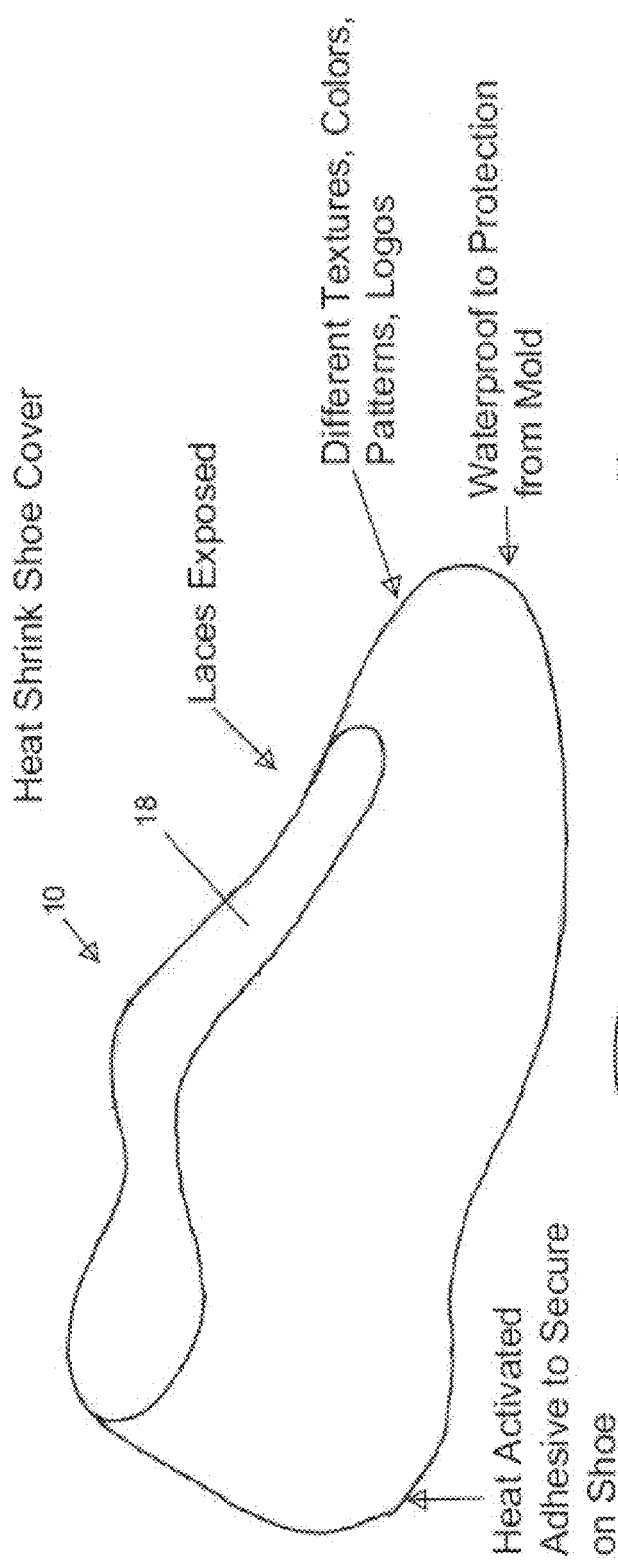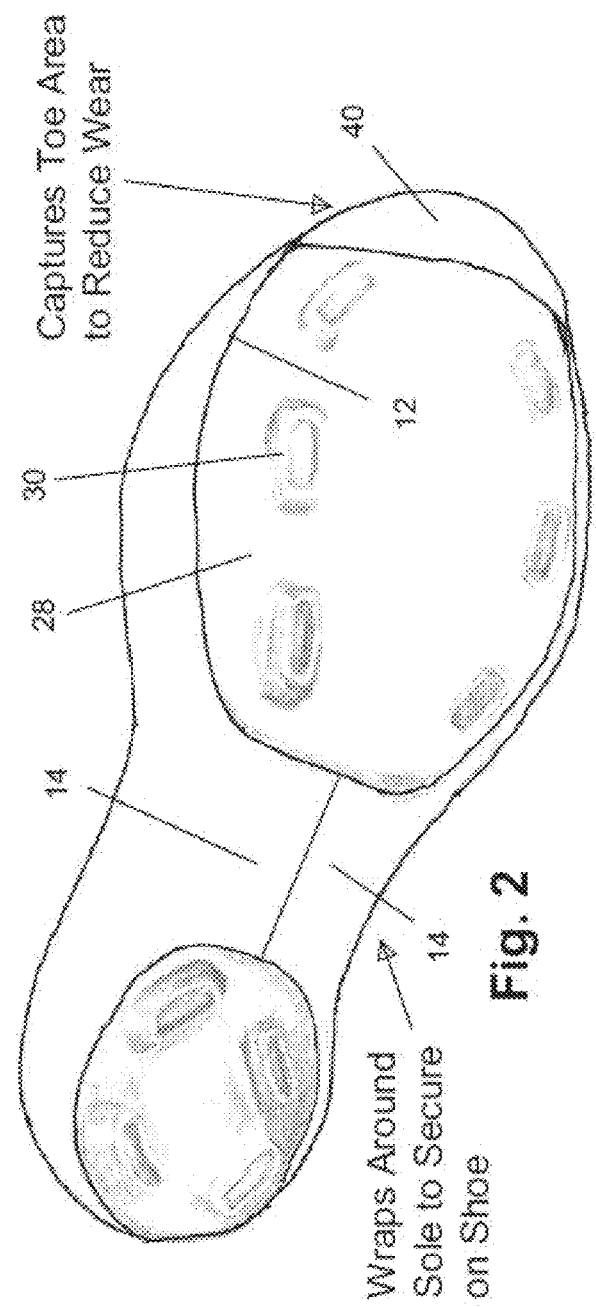

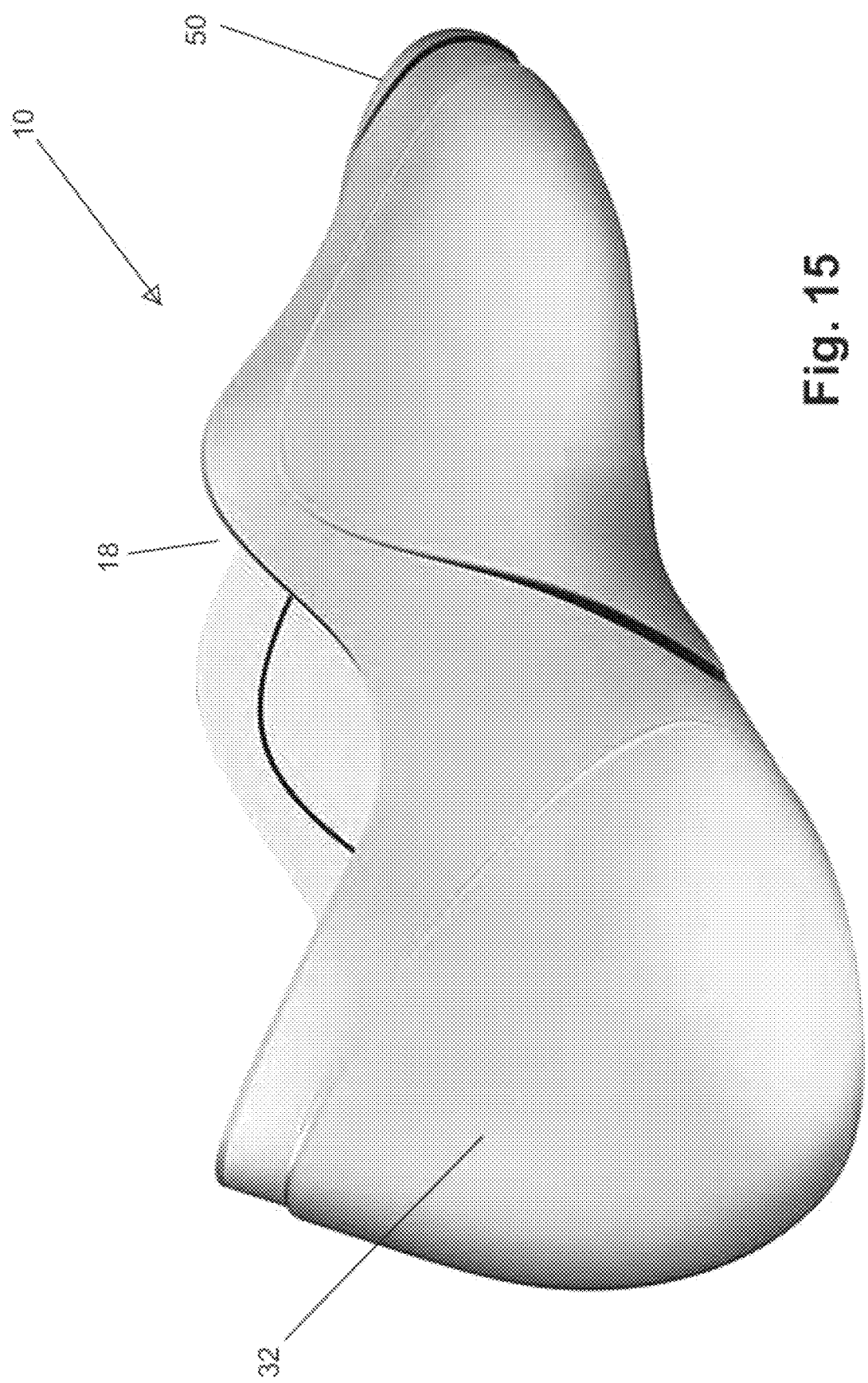

ATHLETIC SHOE PROTECTOR

CROSS-REFERENCE TO RELATED APPLICATION(S)

This application claims the benefit of U.S. Provisional Patent Application Ser. No. 62/436,656, filed Dec. 20, 2016, the entirety of which is hereby incorporated herein by reference.

BACKGROUND OF THE INVENTION

1. Field of the Invention

The present invention relates to athletic shoes with cleats and more particularly to an athletic shoe cover to reinforce the shoe upper and to protect the upper from scuffing and moisture.

2. Description of the Related Art

Athletic shoes with cleats, particularly soccer boots, can cost between $130 and $300 a pair. Because the boots are made of lightweight, thin synthetic, and leather materials, the boots tend to tear up particularly between the vamp of the upper and the sole. In addition, the vamps of the boot develop holes from repeated use.

The uppers of the boots are also very susceptible to water damage, particularly the boots made of all leather uppers. Once the uppers are wet, the uppers lose their shape and often begin to smell due to the bacteria now trapped in the boot.

Another problem is that the sports shoe industry has very high turnover of new styles. This high turnover is particularly true with soccer because soccer is nearly a year-round sport. New styles for soccer boots are released almost monthly, and one has difficulty keeping up with the latest trends. Not only are new styles constantly being released, but also new color combinations and textured patterns that manufactures claim provide a competitive advantage.

Recently, a huge emphasis on customization has developed. Customizing an athletic shoe or a soccer boot can add 50%-100% premium over the original price of the shoe. Moreover, many organized sports require that the entire team be uniform from head to toe. This limits the color options for many preferred shoe styles.

Therefore, there is a need for a protective cover for athletic shoes.

SUMMARY OF THE INVENTION

The disadvantages of the prior art are overcome by the present invention which, in one aspect, is a protector for a shoe having an upper portion with an outer surface, a sole and a closure. A heat shrinkable plastic material is formed into a shoe cover that defines a recess complementary in shape to an upper portion of the shoe. The shoe cover defines a bottom opening having dimensions so as to expose the sole of the shoe when the shoe is placed within the recess. The shoe cover also defines a top opening having dimensions so as expose the closure while still covering the substantially all of the upper portion except for the closure. The heat shrinkable plastic material includes a material that causes the shoe cover to shrink to the outer surface of the shoe when subjected to heat at a predetermined temperature.

In another aspect, the invention is an athletic shoe that includes an upper portion with an outer surface, a sole and a closure. A plastic material is formed into a shoe cover that is affixed to at least the upper portion and that defines a recess complementary in shape to an upper portion of the shoe and affixed thereto. The shoe cover defines a bottom opening having dimensions that expose the sole of the shoe. The shoe cover defines a top opening having dimensions that expose the closure.

In yet another aspect, the invention is a method of protecting a shoe, in which the athletic shoe is placed into a heat shrinkable plastic shoe cover. The shoe cover defines a recess complementary in shape to an upper portion of the shoe and a top opening having dimensions so as expose a shoe closure while still covering substantially all of an upper portion of the shoe except for the closure. Heat is applied to the shoe cover until the shoe cover shrinks so as to form a skin around the shoe.

The present invention, inter alia, addresses the problems identified above for athletic shoes or soccer boots that have cleats. The present invention comprises a temporary cover or skin that covers the surfaces of the shoe that are prone to wear including the upper vamp and the seam between the upper and the sole. Particularly, the shoe cover wraps around the sole seam and covers a portion of the outsole. The shoe cover has holes in order to expose the cleats on the outsole of the shoe. A connecting portion of the shoe cover extends across the arch of the outsole and connects the edges of the shoe cover together. In addition, the eyelets and laces or other closure remain exposed to allow the soccer boot to be tied and untied.

The shoe cover can include a waterproof plastic, such as an ethylene-vinyl acetate (EVA) or a polyolefin material, that creates a barrier to moisture reaching the upper of the shoe. The EVA or polyolefin material is heat shrinkable to fit several sizes of athletic shoes. While not required with EVA due to its inherent adhesive nature, in some polyolefin embodiments, a heat activated adhesive that releasably attaches the shoe cover to the shoe surface is applied to the polyolefin material. The waterproof shoe cover may reduce or eliminate the buildup of bacteria and thereby prevent unwanted odor. Further, the EVA or polyolefin material can be abrasion resistant to thereby protect the upper of the shoe from scuffing or tearing.

Because the shoe cover can include an EVA or polyolefin sheet material, a variety of colors and textures, using a vacuum or thermoforming process, are available. Clear, translucent, and opaque color assortments can be selected. Because the polyolefin sheet material is printable and formable, many unique and exclusive patterns and textures can be employed to customize the athletic shoe or soccer boot to individual tastes. The shoe cover is semi-permanent so it can be removed easily and replaced with a different style or color combination at a significantly lower price than new shoes that manufacturers offer.

These and other aspects of the invention will become apparent from the following description of the preferred embodiments taken in conjunction with the following drawings. As would be obvious to one skilled in the art, many variations and modifications of the invention may be effected without departing from the spirit and scope of the novel concepts of the disclosure.

BRIEF DESCRIPTION OF THE FIGURES OF THE DRAWINGS

FIG. 1 is a top perspective view of an athletic shoe cover in accordance with the present invention.

FIG. 2 is a bottom perspective view of the athletic shoe cover on an athletic shoe in accordance with the present invention.

FIG. 15 is a heel perspective view of the shoe cover in accordance with the present invention.

DETAILED DESCRIPTION OF THE INVENTION

Figure 3A:
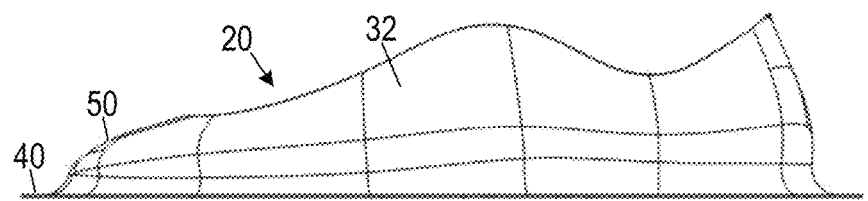
FIG. 3A is an elevational view of a preformed shoe cover blank in accordance with the present invention.

A preferred embodiment of the invention is now described in detail. Referring to the drawings, like numbers indicate like parts throughout the views. Unless otherwise specifically indicated in the disclosure that follows, the drawings are not necessarily drawn to scale. As used in the description herein and throughout the claims, the following terms take the meanings explicitly associated herein, unless the context clearly dictates otherwise: the meaning of "a," "an," and "the" includes plural reference, the meaning of "in" includes "in" and "on."

As shown in FIGS. 1-2, one representative embodiment of a shoe cover 10 can, for example, be used with an athletic shoe such as a soccer boot with cleats. (It can also be used with other types of shoes, including work boots, business shoes, etc.) It reinforces the shoe upper and protects the upper from scuffing and moisture. The shoe cover extends around the seam between the upper and the soul of the shoe and covers a portion of the outsole leaving the cleats exposed. The shoe cover is made of a heat shrinkable material with a heat activated adhesive. The shoe cover is first preformed into a shoe-shaped blank that is fitted over the shoe and then is heated to further conform the shoe cover to the shoe and to activate the adhesive.

Figure 3B:
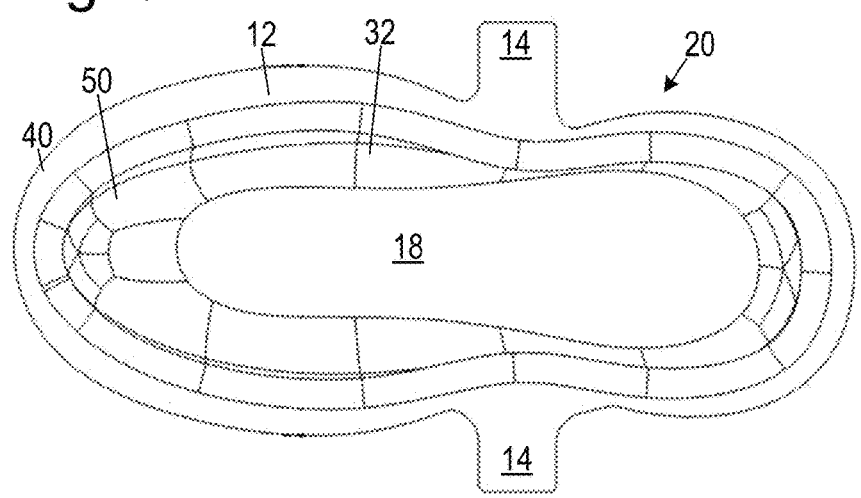
FIG. 3B is a plan view of a preformed shoe cover blank in accordance with the present invention.
Figure 3C:
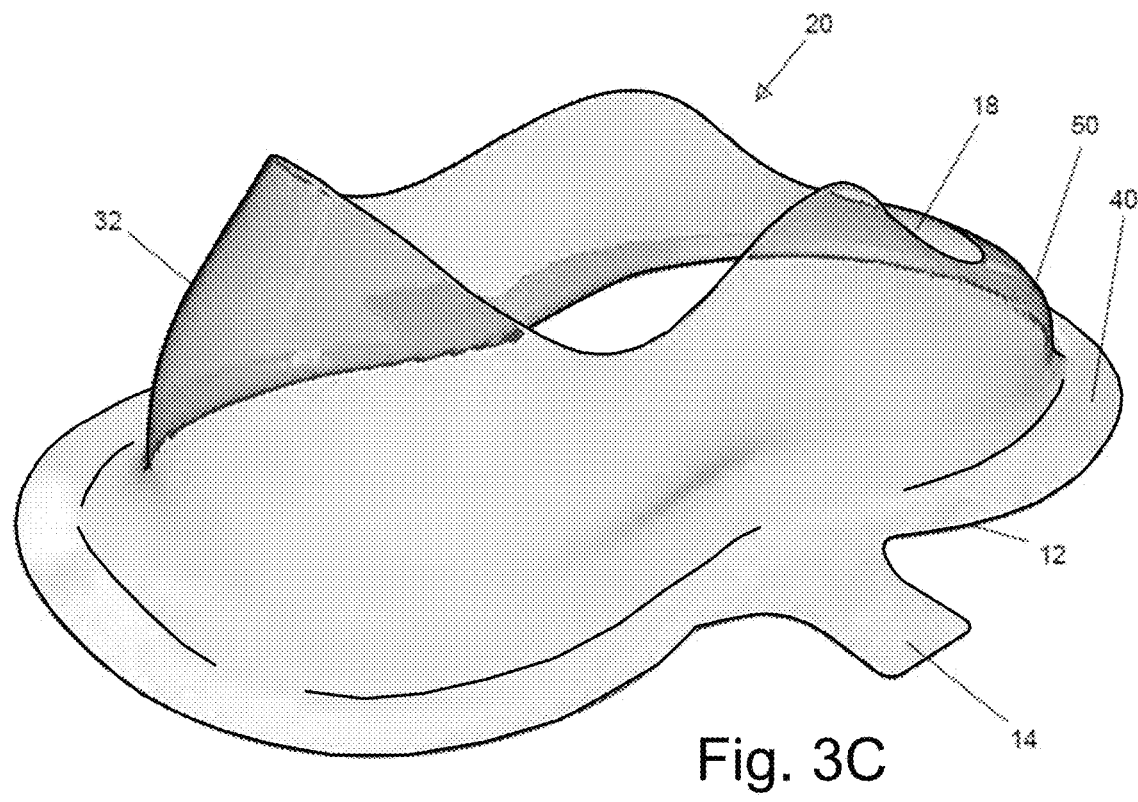
FIG. 3C is a heel perspective view of a preformed shoe cover blank in accordance with the present invention.
Figure 4:
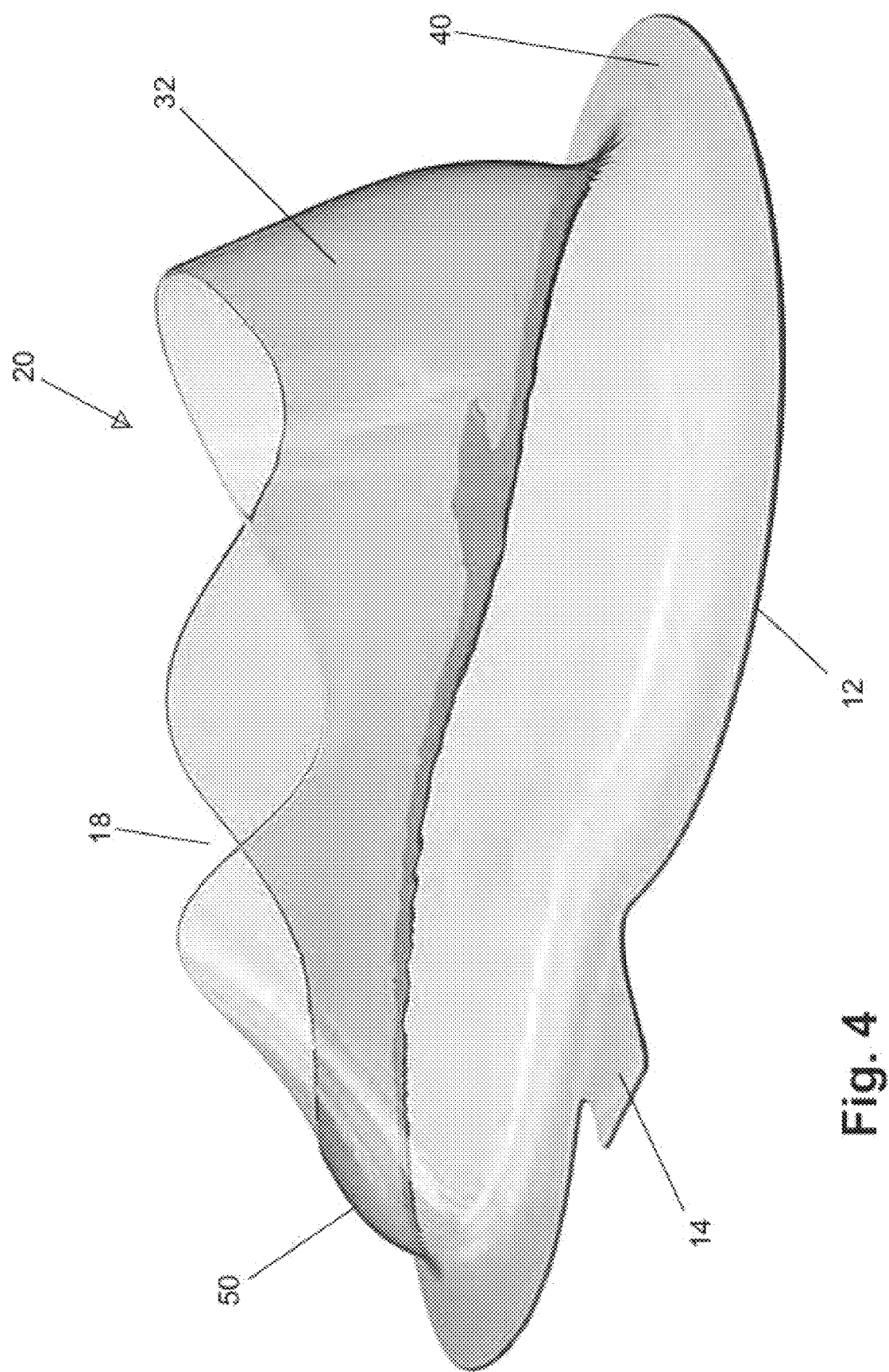
FIG. 4 is a side perspective view of the preformed shoe cover blank in accordance with the present invention.
Figure 5:
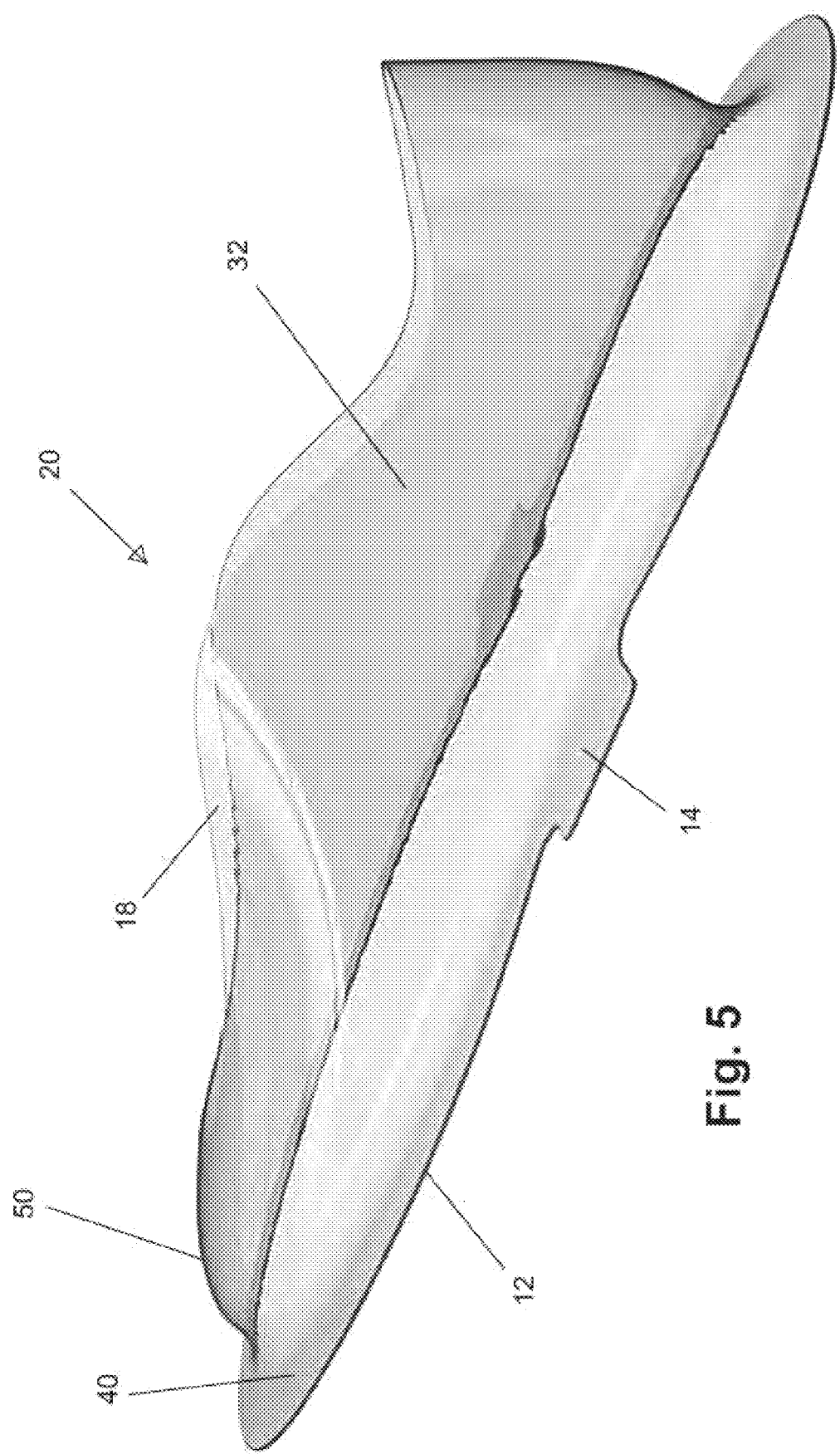
FIG. 5 is a side perspective view of the preformed shoe cover blank in accordance with the present invention.
Figure 6:
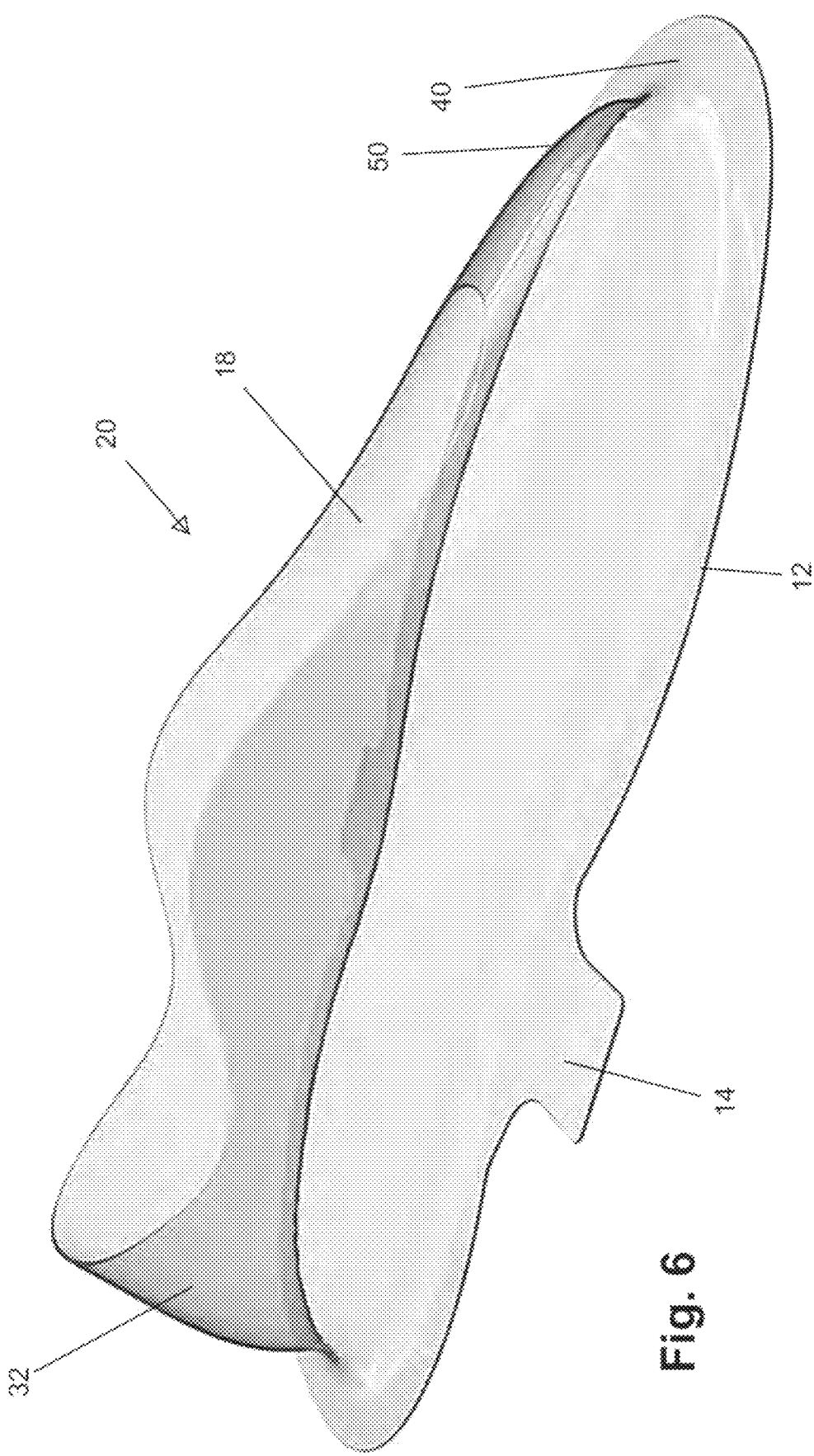
FIG. 6 is a side perspective view of the preformed shoe cover blank in accordance with the present invention.
Figure 7:
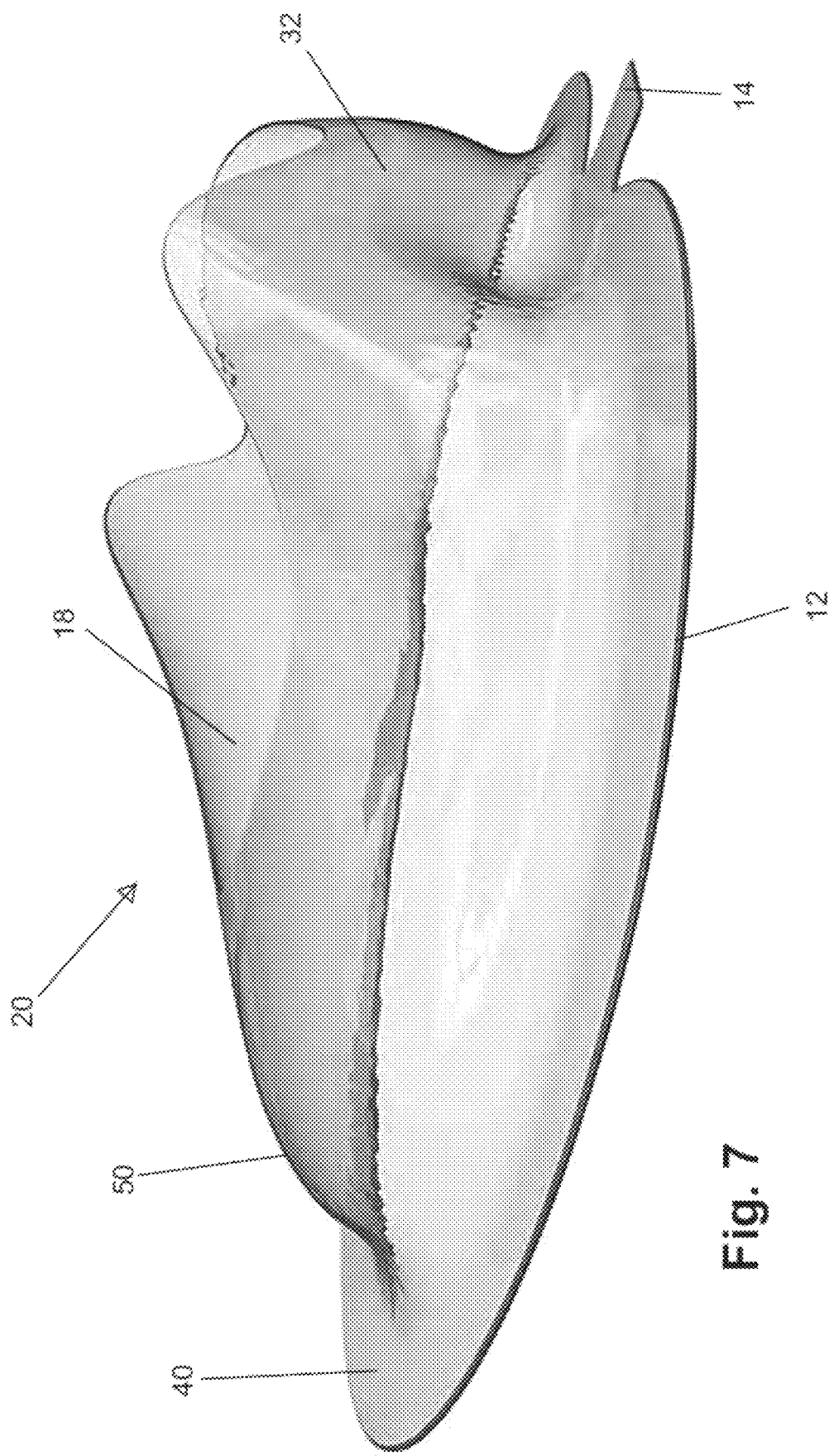
FIG. 7 is a toe perspective view of the preformed shoe cover blank in accordance with the present invention.
Figure 8:
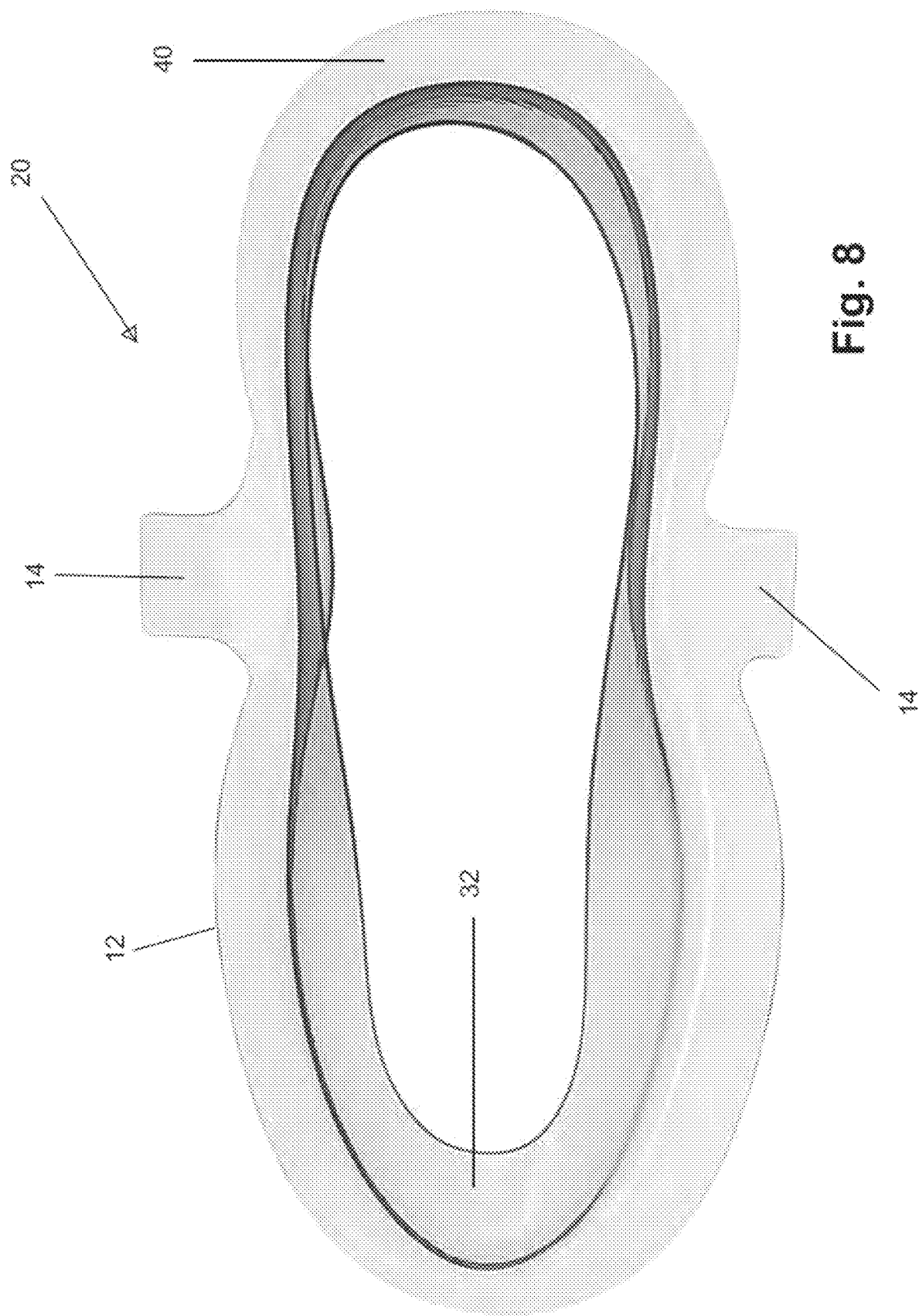
FIG. 8 is a bottom plan view of the preformed shoe cover blank in accordance with the present invention.
Figure 9:
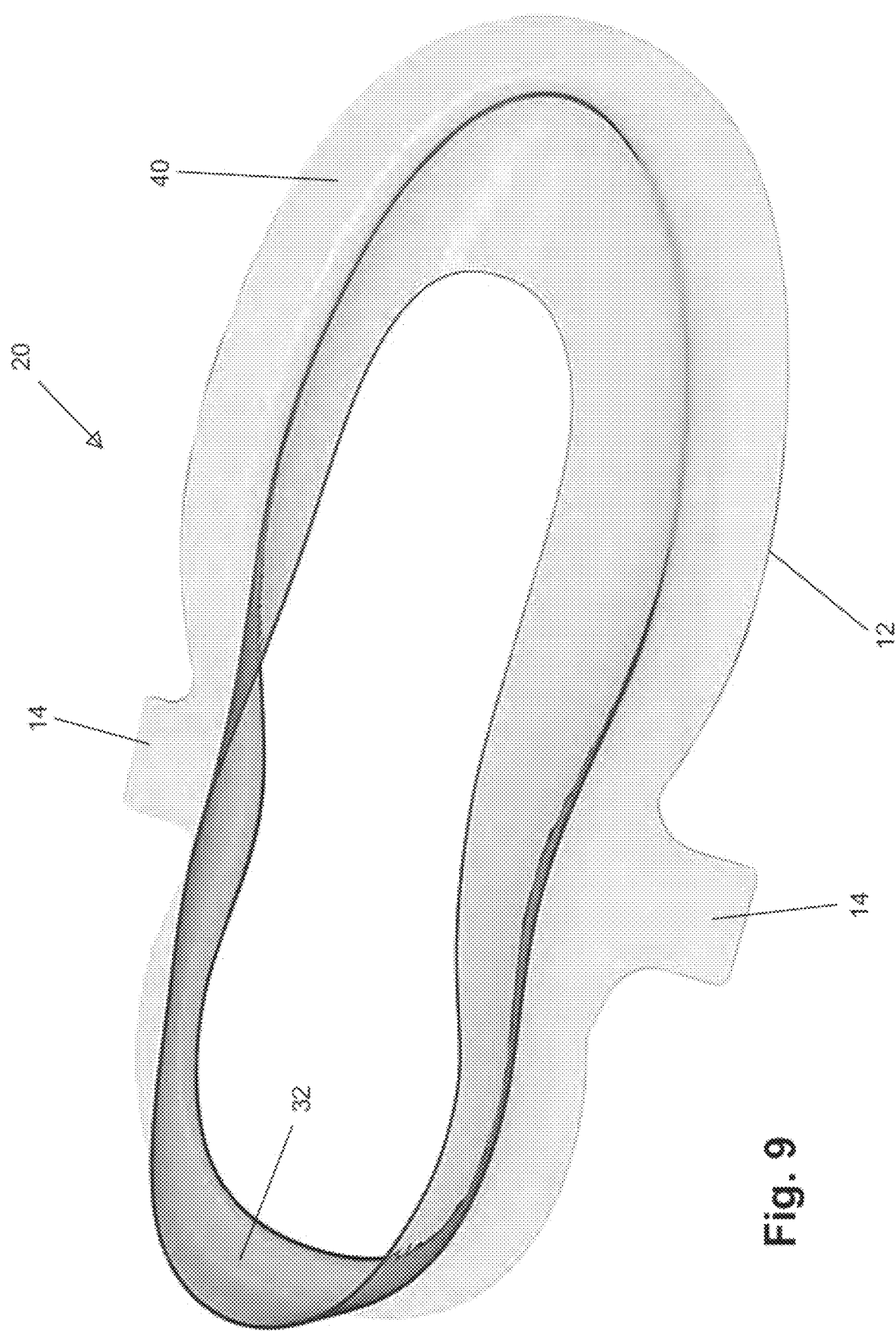
FIG. 9 is a top perspective view of the preformed shoe cover blank in accordance with the present invention.
Figure 10:
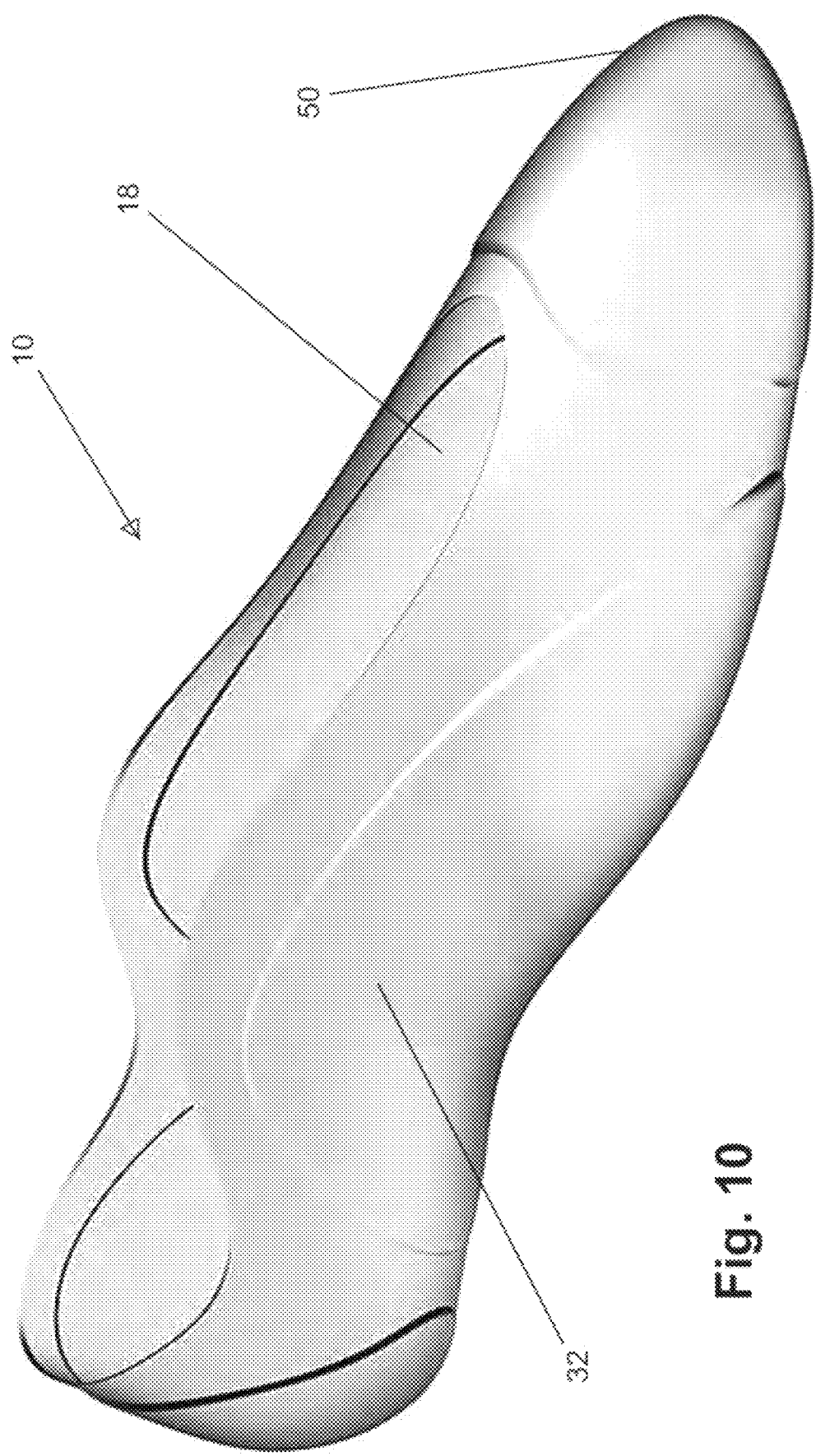
FIG. 10 is a side perspective view of the shoe cover in accordance with the present invention.
Figure 11:
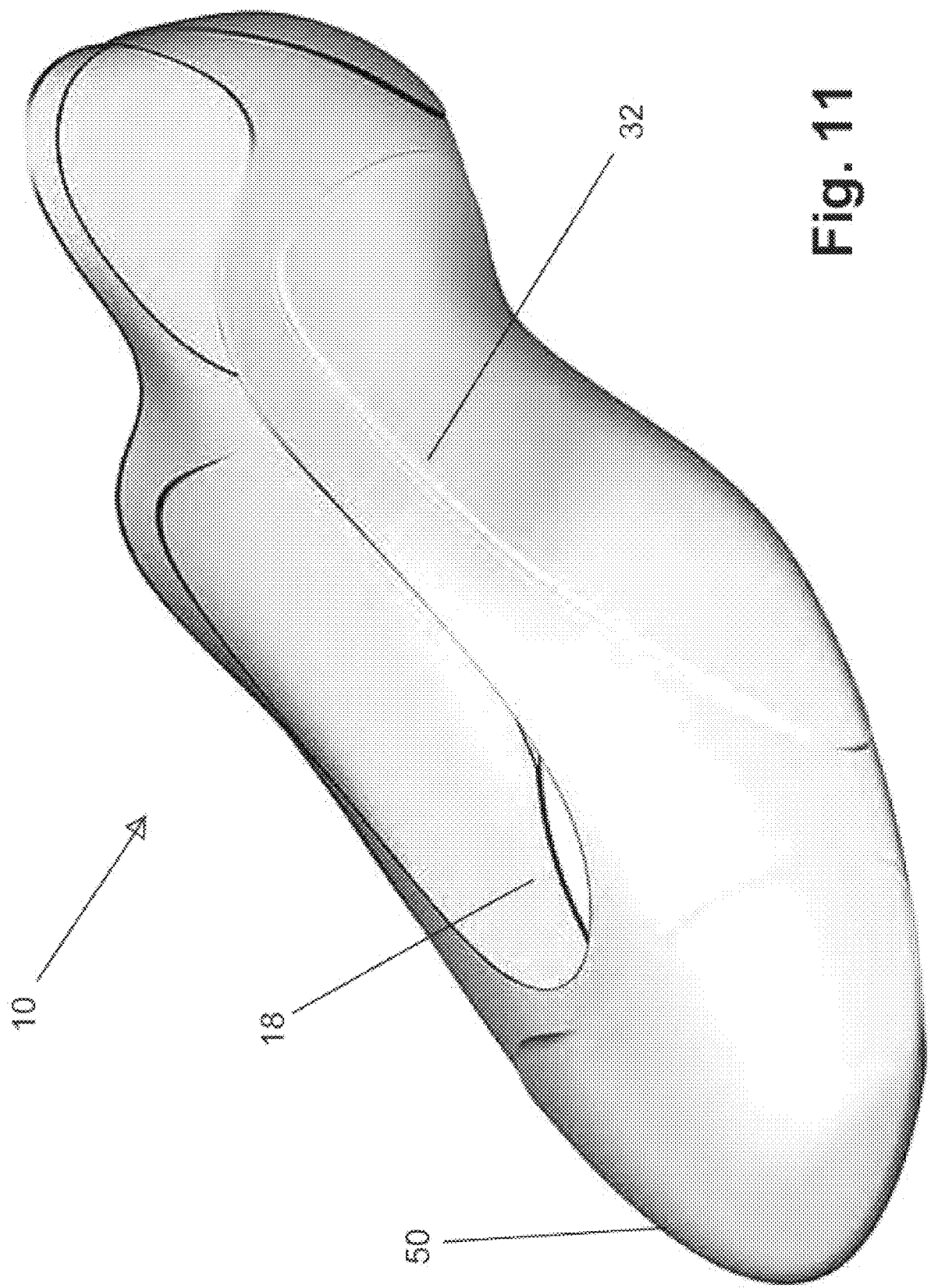
FIG. 11 is a side perspective view of the shoe cover in accordance with the present invention.
Figure 12:
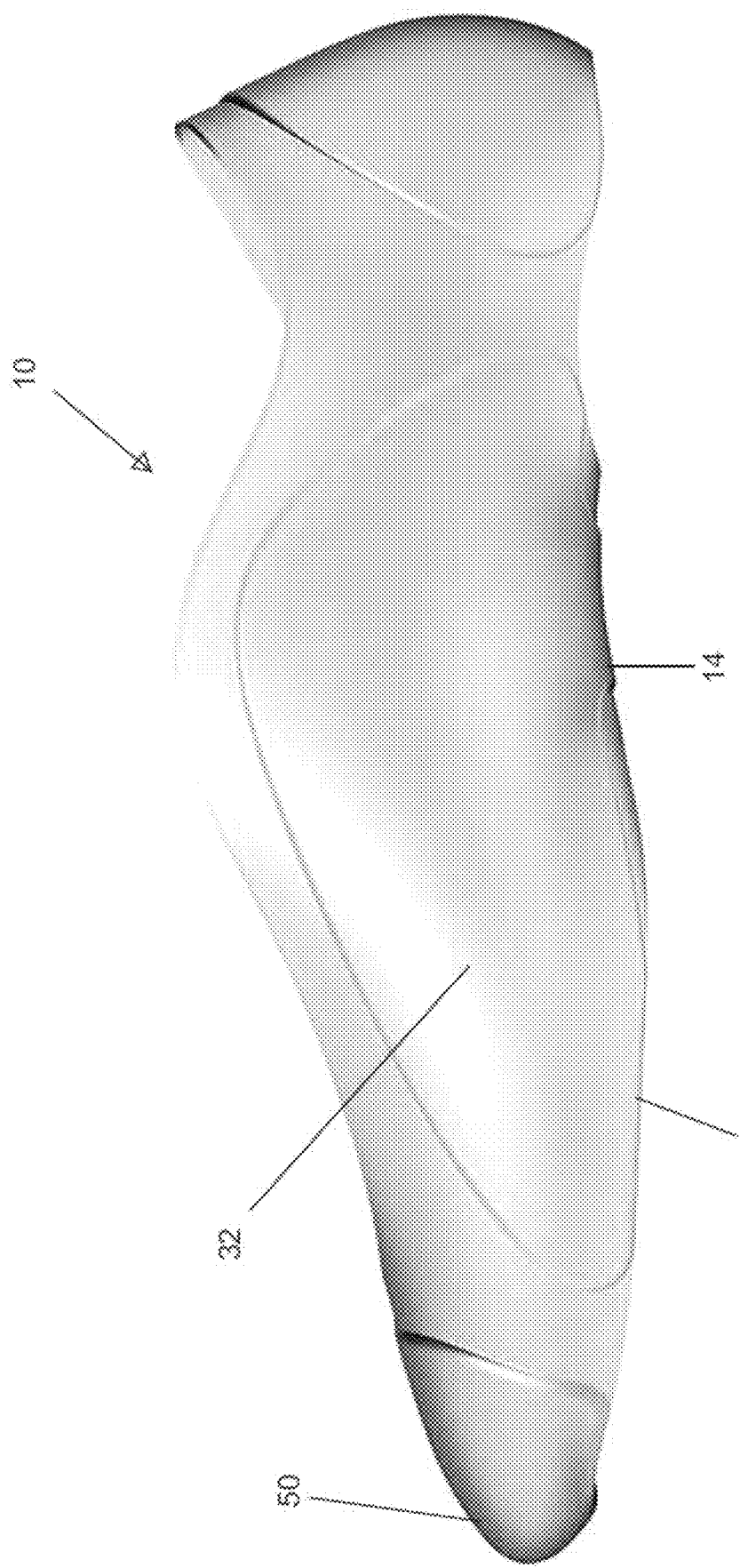
FIG. 12 is a side perspective view of the shoe cover in accordance with the present invention.
Figure 13:
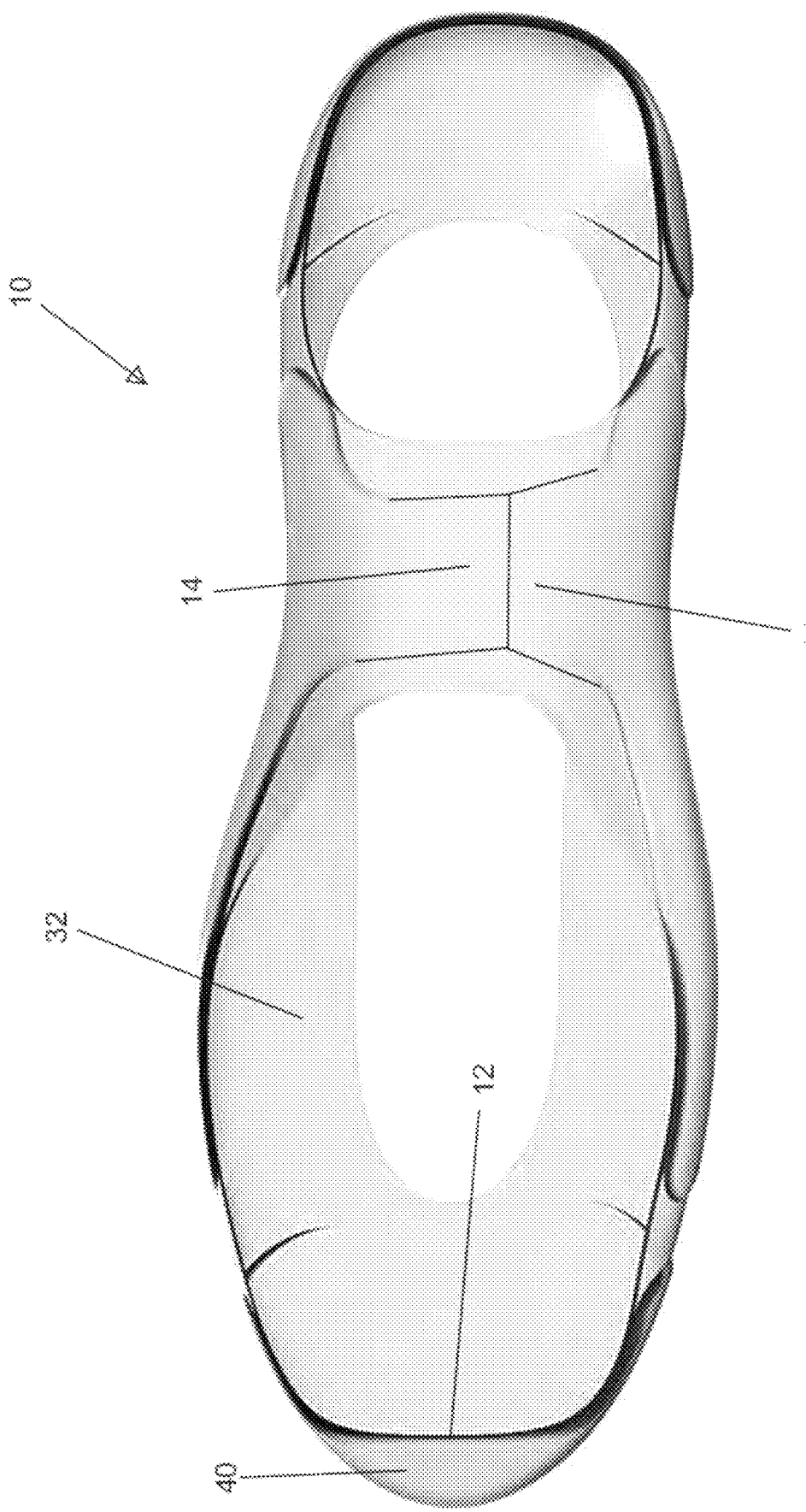
FIG. 13 is a bottom plan view of the shoe cover in accordance with the present invention.
Figure 14:
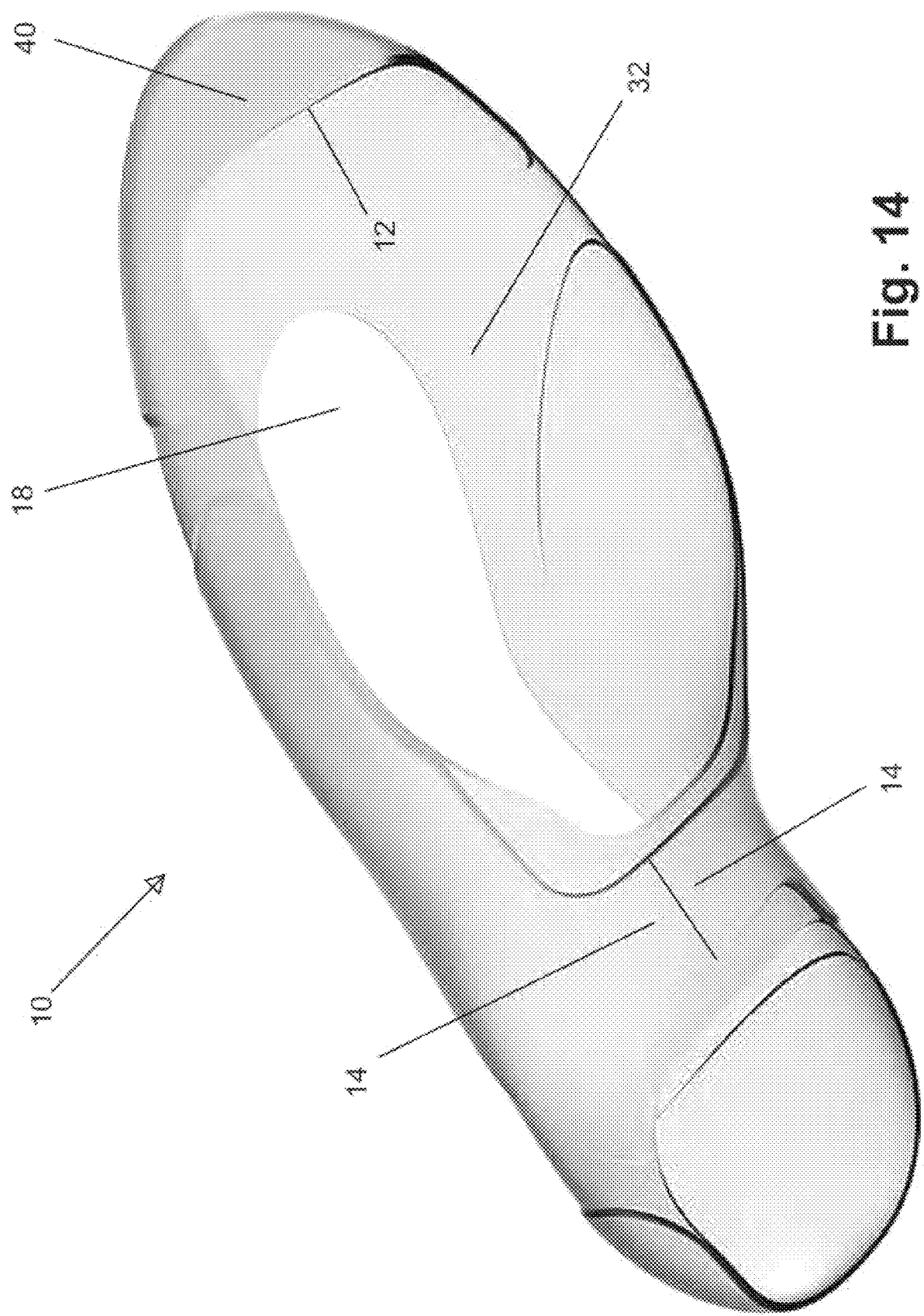
FIG. 14 is a bottom perspective view of the shoe cover in accordance with the present invention.

An athletic shoe cover 10 applied to a shoe is shown in FIGS. 1-2 and 10-15. FIGS. 3-9 show the shoe cover 10 of the present invention as a preformed shoe cover blank 20.

The material that is suitable for the shoe cover of the present invention should be relatively thin (10 mil-30 mil thick and 10 mil-20 mil thick in one commercial embodiment) and be able to shrink to the complex contours of modern day athletic shoes or soccer boots. The material should also be shrinkable at low temperature. Such materials include low temperature shrinkable thermoplastic/elastomeric/polyolefin such as cross-linked polyolefin sheet material with a low recovery temperature of 50° C.–65° C. Such materials include, without limit, ethylene vinyl acetate (EVA), fluorinated ethylene propylene (FEP), perfluoroalkoxy alkane (PFA), polytetrafluoroethylene (PTFE), polyethylene (PE), polypropylene (PP), or polyethylene terephthalate (PET). Alternatively, a cold shrink rubber such as neoprene rubber (NR), nitrile rubber (NBR), and ethylene propylene diene monomer rubber (EPDM) can be used for the shoe cover.

One side of the heat shrinkable material is coated with a heat activated adhesive. The heat activated adhesive is activated at low temperatures again in the range of 50° C.-65° C. Such adhesives are low temperature clear elastomeric adhesives include, for example, adhesives sold under the designation 3M Scotch-Grip plastic adhesives 4693 and 4693H by 3M Company, St. Paul, Minn. and sold under the designation Tribond 1277 by Trillium Products Ltd., Waterfoot, Lancashire, UK.

One commercial embodiment employs 10 mil to 20 mil thick EVA as the material for the shoe cover. It has been found that EVA adheres to the surface of the shoe when heated and, therefore, additional adhesive is not required when EVA is used as the material for the shoe cover.

Before covering the athletic shoe or soccer boot, the sheet material is preformed over a shoe-shaped mandrel to produce a preformed shoe cover blank 20 shown in FIGS. 3-9, which can be done, for example, through vacuum forming. The preformed shoe cover blank 20 has an upper portion 32 that conforms to the basic shape of the upper of an athletic shoe 24 (FIGS. 16-26). The preformed shoe cover blank 20 also has a seam portion 40 with edges 12. The seam portion 40 wraps around the seam between the upper and the soul of the shoe 24 and covers a portion of the outsole 28 of the shoe 24. The preformed shoe cover blank 20 further has tabs 14 (while two tabs are shown, more than two tabs may be used in certain embodiments) that wrap around the arch portion of the outsole of the shoe 24 as best seen in FIG. 23. The preformed shoe cover blank 20 also has an opening 18 extending from near the toe portion 50 of the preformed shoe cover blank 20. The opening 18 accommodates the laces or closures 46 of the shoe 24 when the shoe cover 10 is in place as shown in FIG. 23. Also as shown in FIG. 23, the shoe cover 10 only wraps around a portion of outsole 28 of the shoe 24 in order to leave the cleats 30 exposed.

In certain embodiments, a shoe can be manufactured with a shoe cover as described above applied to the shoe at the factory.

The above described embodiments, while including the preferred embodiment and the best mode of the invention known to the inventor at the time of filing, are given as illustrative examples only. It will be readily appreciated that many deviations may be made from the specific embodiments disclosed in this specification without departing from the spirit and scope of the invention. Accordingly, the scope of the invention is to be determined by the claims below rather than being limited to the specifically described embodiments above.

What is claimed is:

1. A protector and a soccer boot having a plurality of toe cleats and a plurality of heal cleats, wherein the protector is applied to the soccer boot, the soccer boot also having an upper portion with an outer surface, a sole that includes an arch portion disposed between the toe cleats and the heal cleats and a closure, the protector comprising:

(a) a heat shrinkable plastic material formed into a soccer boot cover that defines a recess complementary in shape to an upper portion of the soccer boot, the soccer boot cover defining a bottom opening having dimensions so as to expose the sole of the soccer boot when the soccer boot is placed within the recess, the soccer boot cover defining a top opening having dimensions so as expose the closure while still covering the substantially all of the upper portion except for the closure, wherein the heat shrinkable plastic material includes a material that causes the soccer boot cover to shrink to the outer surface of the soccer boot when subjected to heat at a predetermined temperature;

(b) a heat sensitive adhesive applied to an inner side of the heat shrinkable plastic so as to be in contact with at least a top side of the soccer boot such that the heat sensitive adhesive causes the heat shrinkable plastic to adhere to at least the top side of the soccer boot when heat is applied thereto; and (c) two tabs, each tab extending outwardly from a different side of the soccer boot cover at a mid-region of the soccer boot cover and configured to be folded under the arch portion of the soccer boot and to connect with each other so as to divide the bottom opening into a front region that exposes the plurality of toe cleats extending from the sole of the soccer boot and a back region that exposes the plurality of heal cleats extending from the sole of the soccer boot.

2. The protector of claim 1, wherein the heat shrinkable plastic comprises ethylene vinyl acetate.

3. The protector of claim 1, wherein the heat shrinkable plastic has a thickness in a range 10 mil to 30 mil.

4. The protector of claim 3, wherein the heat shrinkable plastic has a thickness in a range 10 mil to 20 mil.

5. The protector of claim 1, wherein the heat shrinkable plastic material includes at least one three dimensional image extending from an outer surface of the soccer boot cover.

6. The protector of claim 1, wherein the heat shrinkable plastic material includes at least one two dimensional image printed on an outer surface of the soccer boot cover.

7. A soccer boot, comprising:

(a) an upper portion with an outer surface, a sole and a closure laces for closing the soccer boot;

(b) a plurality of cleats extending downwardly from the sole, the plurality of cleats including a plurality of toe cleats and a plurality of heal cleats;

(c) a heat shrinkable plastic material formed into a soccer boot cover that is affixed to at least the upper portion and that defines a recess complementary in shape to the upper portion of the soccer boot and affixed thereto, the shoe cover defining a bottom opening having dimensions that expose the sole of the soccer boot, the soccer boot cover defining a top opening having dimensions that expose the laces closure; and (d) two connecting portions, each extending outwardly from the soccer boot cover at a mid-region of the soccer boot cover and configured to be folded under the arch portion of the soccer boot and to connect with each other so as to divide the bottom opening into a front region that exposes the plurality of toe cleats and a back region that exposes the plurality of heal cleats.

8. The soccer boot of claim 7, wherein the heat shrinkable plastic material comprises ethylene vinyl acetate.

9. The soccer boot of claim 7, wherein the heat shrinkable plastic material has a thickness in a range 10 mil to 30 mil.

10. The soccer boot of claim 9, wherein the heat shrinkable plastic material has a thickness in a range 10 mil to 20 mil.

11. The soccer boot of claim 7, wherein the heat shrinkable plastic material includes at least one three dimensional image extending from an outer surface of the shoe cover.

12. The soccer boot of claim 7, wherein the heat shrinkable plastic material includes at least one two dimensional image printed on an outer surface of the shoe cover.

13. A method of protecting a soccer boot, comprising the steps of:

(a) placing the soccer boot into a heat shrinkable plastic soccer boot cover that defines a recess complementary in shape to an upper portion of the soccer boot and a top opening having dimensions so as expose a soccer boot closure while still covering substantially all of the upper portion of the soccer boot except for the soccer boot closure;

(b) connecting to each other two connecting portions, each connecting portion extending outwardly from the soccer boot cover at a mid-region of the soccer boot cover that are folded under the arch portion of the soccer boot, so as to divide the bottom opening into a front region that exposes toe cleats extending from the sole of the soccer boot and a back region that exposes heal cleats extending from the sole of the soccer boot; and (c) applying heat to the soccer boot cover until the soccer boot cover shrinks so as to form a skin around the soccer boot.

14. The method of claim 13, wherein the heating step comprises the step of heating the soccer boot cover with a selected one of a portable hair dryer and a heat gun.

15. The method of claim 13, wherein the soccer boot closure comprises shoelaces.

16. The method of claim 13, wherein the heat shrinkable plastic soccer boot cover includes an adhesive and wherein the heating step further comprises activating the adhesive so as to secure the soccer boot cover to the outer surface of the upper portion of the soccer boot.

* * * * *